(12) United States Patent
Ito et al.

(10) Patent No.: US 10,711,862 B2
(45) Date of Patent: Jul. 14, 2020

(54) DAMPER DEVICE

(71) Applicants: AISIN AW CO., LTD., Anjo-shi, Aichi-ken (JP); AISIN AW INDUSTRIES CO., LTD, Echizen-shi, Fukui (JP)

(72) Inventors: Kazuyoshi Ito, Tsushima (JP); Makoto Nakazuru, Inazawa (JP); Shuhei Warashina, Anjo (JP); Tanaka Katsunori, Fukui (JP); Tomoyuki Hiramoto, Sabae (JP)

(73) Assignees: AISIN AW CO., LTD., Anjo (JP); AISIN AW INDUSTRIES CO., LTD, Echizen-shi (JP)

( * ) Notice: Subject to any disclaimer, the term of this patent is extended or adjusted under 35 U.S.C. 154(b) by 232 days.

(21) Appl. No.: 15/759,379

(22) PCT Filed: Sep. 28, 2016

(86) PCT No.: PCT/JP2016/078677
§ 371 (c)(1),
(2) Date: Mar. 12, 2018

(87) PCT Pub. No.: WO2017/057490
PCT Pub. Date: Apr. 6, 2017

(65) Prior Publication Data
US 2018/0266516 A1 Sep. 20, 2018

(30) Foreign Application Priority Data
Sep. 30, 2015 (JP) ................................ 2015-192858

(51) Int. Cl.
*F16F 15/134* (2006.01)
*F16F 15/123* (2006.01)
*F16H 45/02* (2006.01)

(52) U.S. Cl.
CPC ...... *F16F 15/134* (2013.01); *F16F 15/12366* (2013.01); *F16H 45/02* (2013.01);
(Continued)

(58) Field of Classification Search
CPC ... F16F 15/134; F16F 15/12366; F16H 45/02; F16H 2045/0247; F16H 2045/0231; F16H 2045/0284
See application file for complete search history.

(56) References Cited

U.S. PATENT DOCUMENTS

| 6,244,401 B1 * | 6/2001 | Maienschein ........... F16H 45/02 192/213.1 |
| 7,658,679 B2 * | 2/2010 | Avins ................. F16F 15/12366 192/213.1 |

(Continued)

FOREIGN PATENT DOCUMENTS

| JP | H11-173383 A | 6/1999 |
| JP | 2004-270786 A | 9/2004 |

(Continued)

OTHER PUBLICATIONS

Nov. 1, 2016 International Search Report issued in Patent Application No. PCT/JP2016/078677.

*Primary Examiner* — Tinh Dang
(74) *Attorney, Agent, or Firm* — Oliff PLC

(57) ABSTRACT

A damper device that includes an elastic body support provided to the intermediate element to support both end portions of the third elastic body at least when torque is not transferred between the input and the output; and an elastic body abutment provided to one of the input and the output, the elastic body abutment not abutting against an end portion of the third elastic body at least when torque is not transferred between the input and the output, but abutting against one of the end portions of the third elastic body as a relative torsional angle between the one of the input and the output and the intermediate element is increased when torque is transferred between the input and the output.

12 Claims, 4 Drawing Sheets

(52) U.S. Cl.
CPC ........... *F16H 2045/0231* (2013.01); *F16H 2045/0247* (2013.01); *F16H 2045/0284* (2013.01)

(56) References Cited

U.S. PATENT DOCUMENTS

| | | | | |
|---|---|---|---|---|
| 8,720,658 | B2 * | 5/2014 | Ito | F16F 15/145 192/3.29 |
| 9,046,161 | B2 * | 6/2015 | Takikawa | F16H 45/02 |
| 2004/0216979 | A1 | 11/2004 | Yamashita et al. | |
| 2008/0257674 | A1 * | 10/2008 | Sasse | F16H 45/02 192/3.29 |
| 2008/0257675 | A1 * | 10/2008 | Sasse | F16H 45/02 192/3.29 |
| 2010/0133063 | A1 * | 6/2010 | Degler | F16F 15/12366 192/30 V |
| 2013/0205944 | A1 * | 8/2013 | Sudau | F16F 15/1315 74/573.1 |
| 2017/0175849 | A1 * | 6/2017 | Ito | F16F 15/12366 |

FOREIGN PATENT DOCUMENTS

| | | |
|---|---|---|
| JP | 2009-243536 A | 10/2009 |
| JP | 2012-140063 A | 7/2012 |
| JP | 2015-163800 A | 9/2015 |

\* cited by examiner

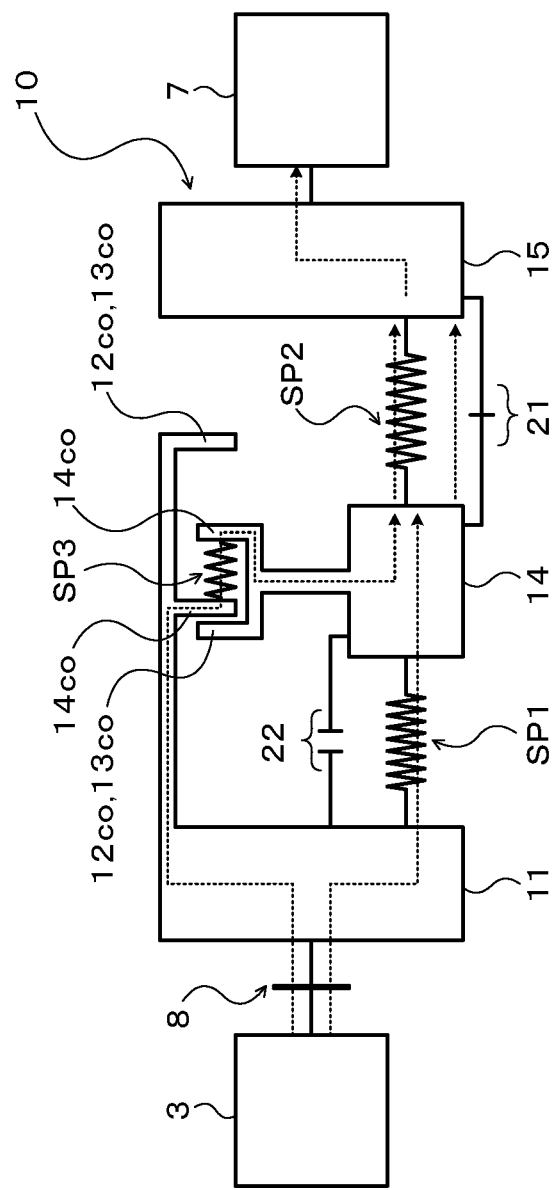

DAMPER DEVICE

BACKGROUND

The disclosure relates to a damper device that includes an input element, an intermediate element, an output element, a first elastic body that transfers torque between the input element and the intermediate element, and a second elastic body that transfers torque between the intermediate element and the output element.

There has hitherto been known a damper device that includes: a center disk that serves as an input element that has a plurality of spring retainers that extend from the inner periphery; two plates that serve as an output element and interpose the center disk; a plurality of damper springs (first and second elastic bodies) disposed in pairs between the spring retainers of the center disk which are adjacent to each other; and a ring-shaped intermediate member that has a plurality of separators each interposed between the two damper springs which are paired with each other, and in the damper device the two damper springs which are paired with each other are caused to act in series with each other (see Japanese Patent Application Publication No. 2009-243536, for example). The damper device further includes an auxiliary damper spring fitted in a long hole formed in the outer peripheral portion of the center disk. An arcuate housing space (window) that houses a side portion of the auxiliary damper spring is formed in each of the two plates. The housing space of each plate has a circumferential length that is longer than that of the auxiliary damper spring. When the center disk is rotated and the damper spring is compressed and deformed, the auxiliary damper spring is moved along the housing space. When the amount of compressive deformation of the damper spring exceeds a certain amount, the auxiliary damper spring abuts against one of receiving surfaces formed on both sides of the housing space. Consequently, when the auxiliary damper spring abuts against one of receiving surfaces formed on both sides of the housing space, the auxiliary damper spring and the damper springs act in parallel with each other to absorb large impact torque transferred to the center disk and torque fluctuations. When impact torque that is so large as not to be absorbed even by compressive deformation of the auxiliary damper spring is transferred to the center disk, a stopper supported by the two plates abuts against a stopper receiving surface formed on the center disk.

SUMMARY

In the damper device according to the related art described above, the circumferential length of the housing space of the plates is determined in accordance with the torsional angle of the center disk (input element) relative to the two plates (output element) before the amount of the compressive deformation of the damper springs, which acts in series with each other, reaches the certain amount. Thus, in order to cause the auxiliary damper spring and the damper springs to act in parallel with each other when torque transferred to the center disk has become larger, it is necessary to make the circumferential length (opening length) of the housing space larger such that the auxiliary damper spring does not abut against the receiving surfaces by that time. Meanwhile, the circumferential length of the housing space that can be formed in the plates is restricted by the size of the plates and the strength of the plates that should be secured. Thus, in the damper device according to the related art described above, when it is attempted to cause the auxiliary damper spring and the damper spring to act in series with each other in order that larger impact torque and torque fluctuations can be absorbed, the maximum torsional angle of the center disk (input element) relative to the two plates (output element) must be reduced.

An exemplary aspect of the disclosure provides a damper device that can absorb larger torque fluctuations and that has lower rigidity by increasing the maximum torsional angle of an input element relative to an output element.

The present disclosure provides a damper device that includes an input; an intermediate element; an output; a first elastic body disposed between the input and the intermediate element; a second elastic body disposed between the intermediate element and the output to act in series with the first elastic body; a third elastic body that is capable of acting in parallel with at least one of the first and second elastic bodies; an elastic body support provided to the intermediate element to support both end portions of the third elastic body at least when torque is not transferred between the input and the output; and an elastic body abutment provided to one of the input and the output, the elastic body abutment not abutting against an end portion of the third elastic body at least when torque is not transferred between the input and the output, but abutting against one of the end portions of the third elastic body as a relative torsional angle between the one of the input and the output and the intermediate element is increased when torque is transferred between the input and the output.

With the damper device, when the elastic body abutment of one of the input and the output abuts against an end portion of the third elastic body, the third elastic body acts in parallel with at least one of the first and second elastic bodies, and thus large torque fluctuations transferred to the input can be absorbed by at least one of the first and second elastic bodies and the third elastic body. With the elastic body support provided to the intermediate element, in addition, the clearance between the elastic body abutment and one of the end portions of the third elastic body at least at the time when torque is not transferred between the input and the output is determined in accordance with the relative torsional angle between one of the input and the output and the intermediate element. Consequently, with the damper device, it is possible to reduce the clearance between the elastic body abutment and one of the end portions of the third elastic body at the time when torque is not transferred between the input and the output as compared to the case where the elastic body support is provided to one of the input and the output. Thus, it is not necessary to reduce the relative torsional angle between the input and the output in order to cause the third elastic body to act in parallel with at least one of the first and second elastic bodies, and thus the rigidity of the damper device can be lowered by increasing the maximum torsional angle of the input relative to the output. As a result, it is possible to provide a damper device that can absorb larger torque fluctuations and that has lower rigidity by increasing the maximum torsional angle of the input relative to the output.

BRIEF DESCRIPTION OF THE DRAWINGS

FIG. 4 is a schematic diagram illustrating operation of the damper device according to the present disclosure.

DETAILED DESCRIPTION OF EMBODIMENTS

Now, an embodiment of the disclosure according to the present disclosure will be described with reference to the drawings.

Figure 1:
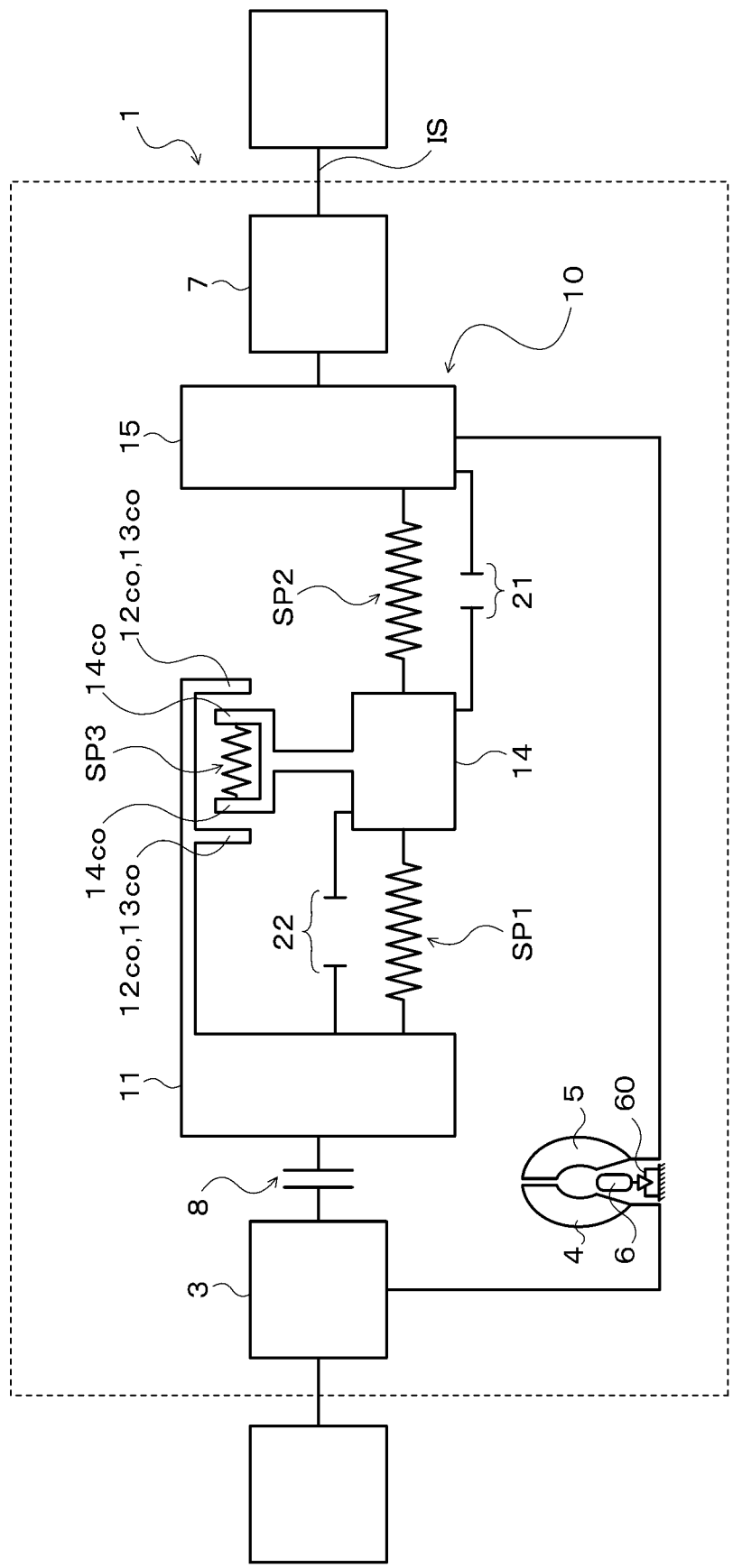
FIG. 1 is a schematic diagram of a starting device that includes a damper device according to the present disclosure.
Figure 2:
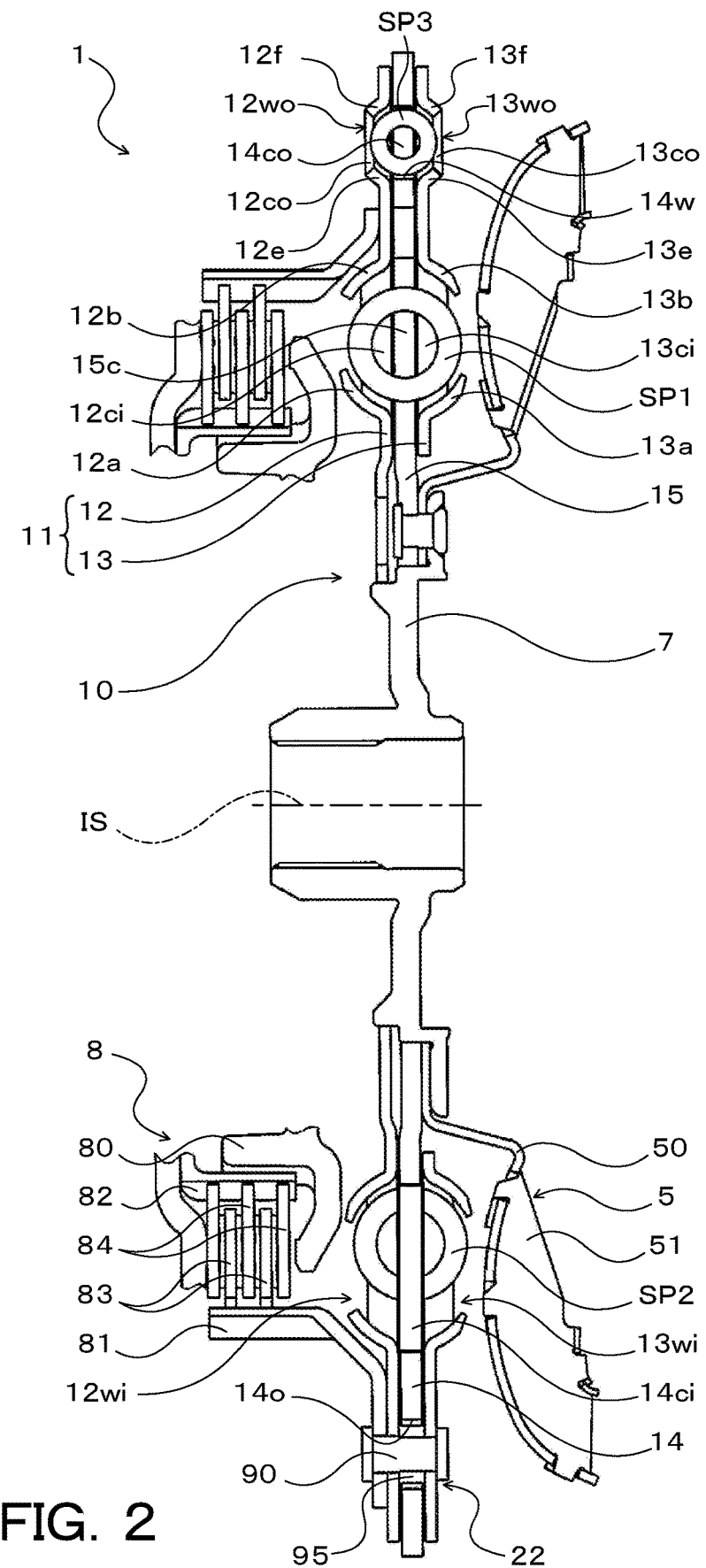
FIG. 2 is a sectional view illustrating an essential portion of the starting device of FIG. 1.

FIG. 1 is a schematic diagram illustrating a starting device 1 that includes a damper device 10 according to the present disclosure. FIG. 2 is a sectional view illustrating an essential portion of the starting device 1. The starting device 1 illustrated in the drawings is mounted on a vehicle that includes an engine (internal combustion engine) that serves as a drive device. In addition to the damper device 10, the starting device 1 includes: a front cover 3 that serves as an input member which is coupled to a crankshaft of the engine and to which torque from the engine is transferred; a pump impeller (input-side fluid transmission element) 4 fixed to the front cover 3; a turbine runner (output-side fluid transmission element) 5 that is coaxially rotatable with the pump impeller 4; a damper hub 7 that serves as an output member coupled to the damper device 10 and fixed to an input shaft IS of a transmission that is an automatic transmission (AT) or a continuously variable transmission (CVT); a lock-up clutch 8; and so forth.

In the following description, unless specifically stated, the term "axial direction" basically indicates the direction of extension of the center axis (axis) of the starting device 1 or the damper device 10. In addition, unless specifically stated, the term "radial direction" basically indicates the radial direction of the starting device 1, the damper device 10, or a rotary element of the damper device 10 etc., that is, the direction of extension of a line that extends in directions (radial directions) that are orthogonal to the center axis of the starting device 1 or the damper device 10 from the center axis. Furthermore, unless specifically stated, the term "circumferential direction" basically indicates the circumferential direction of the starting device 1, the damper device 10, or a rotary element of the damper device 10 etc., that is, a direction along the rotational direction of such a rotary element.

The pump impeller 4 has a pump shell (not illustrated) tightly fixed to the front cover 3, and a plurality of pump blades (not illustrated) disposed on the inner surface of the pump shell. As illustrated in FIG. 2, the turbine runner 5 has a turbine shell 50 and a plurality of turbine blades 51 disposed on the inner surface of the turbine shell 50. The inner peripheral portion of the turbine shell 50 is fixed to the damper hub 7 via a plurality of rivets. The pump impeller 4 and the turbine runner 5 face each other. A stator 6 (see FIG. 1) is disposed between and coaxially with the pump impeller 4 and the turbine runner 5. The stator 6 adjusts a flow of working oil (working fluid) from the turbine runner 5 to the pump impeller 4. The stator 6 has a plurality of stator blades. The rotational direction of the stator 6 is set to only one direction by a one-way clutch 60. The pump impeller 4, the turbine runner 5, and the stator 6 form a torus (annular flow passage) that allows circulation of working oil, and function as a torque converter (fluid transmission apparatus) with a torque amplification function. It should be noted, however, that the stator 6 and the one-way clutch 60 may be omitted from the starting device 1, and that the pump impeller 4 and the turbine runner 5 may function as a fluid coupling.

The lock-up clutch 8 is constituted as a hydraulic multi-plate clutch, and can establish and release lock-up in which the front cover 3 and the damper hub 7 are coupled to each other via the damper device 10. The lock-up clutch 8 includes: a lock-up piston 80 supported by a center piece, which is fixed to the front cover 3, so as to be movable in the axial direction; a clutch drum 81; an annular clutch hub 82 fixed to the inner surface of a sidewall portion of the front cover 3 so as to face the lock-up piston 80; a plurality of first friction engagement plates (friction plates having a friction material on both surfaces) 83 fitted with spines formed on the inner periphery of the clutch drum 81; and a plurality of second friction engagement plates (separator plates) 84 fitted with splines formed on the outer periphery of the clutch hub 82.

The lock-up clutch 8 further includes: an annular flange member (oil chamber defining member) attached to a center piece (not illustrated) of the front cover 3 so as to be positioned on the side opposite of the lock-up piston 80 from the front cover 3, that is, so as to be positioned closer to the damper device 10 and the turbine runner 5 than the lock-up piston 80; and a plurality of return springs disposed between the front cover 3 and the lock-up piston 80 (neither of the flange member and the return springs are illustrated). As illustrated in the drawings, the lock-up piston 80 and the flange member define an engagement oil chamber (not illustrated). Working oil (engagement hydraulic pressure) is supplied to the engagement oil chamber from a hydraulic control device (not illustrated). Increasing the engagement hydraulic pressure for the engagement oil chamber moves the lock-up piston 80 in the axial direction so as to press the first and second friction engagement plates 83 and 84 toward the front cover 3, which can bring the lock-up clutch 8 into engagement (complete engagement or slip engagement). The lock-up clutch 8 may be constituted as a hydraulic single-plate clutch.

As illustrated in FIGS. 1 and 2, the damper device 10 includes, as rotary elements, a drive member (input element/input) 11, an intermediate member (intermediate element) 14, and a driven member (output element/output) 15. The damper device 10 further includes, as torque transfer elements (torque transfer elastic bodies): a plurality of (e.g. three in the present embodiment) first springs (first elastic bodies) SP1 that transfer torque between the drive member 11 and the intermediate member 14; a plurality of (e.g. three in the present embodiment) second springs (second elastic bodies) SP2 that act in series with the respective first springs SP1 to transfer torque between the intermediate member 14 and the driven member 15; and a plurality of (e.g. three in the present embodiment) third springs SP3 that transfer torque between the drive member 11 and the driven member 15.

In the present embodiment, linear coil springs made of a metal material spirally wound so as to have an axis that extends straight when no load is applied are adopted as the first and second springs SP1 and SP2 and the third springs SP3. Consequently, the first and second springs SP1 and SP2 and the third springs SP3 can be expanded and contracted adequately along the axes compared to the case where arc coil springs are used. As a result, it is possible to reduce a hysteresis, that is, the difference between torque transferred from the second springs SP2 etc. to the driven member 15 when relative displacement between the drive member 11 (input element) and the driven member 15 (output element) is increased and torque transferred from the second springs SP2 etc. to the driven member 15 when relative displacement between the drive member 11 and the driven member 15 is decreased. It should be noted, however, that arc coil springs may be adopted as at least any of the first and second springs SP1 and SP2 and the third springs SP3. In the present embodiment, the first and second springs SP1 and SP2 have spring constants that are different from each other. It should be noted, however, that the spring constants of the first and second springs SP1 and SP2 may be the same as each other.

As illustrated in FIG. 2, the drive member 11 of the damper device 10 includes: an annular first input plate 12 rotatably supported by the damper hub 7 and disposed in proximity to the lock-up clutch 8; and an annular second input plate 13 having an inside diameter that is larger than that of the first input plate 12 and disposed in proximity to the turbine runner 5. The first and second input plates 12 and 13 are coupled so as to face each other along the axial direction of the damper device 10 via a plurality of rivets 90, and coupled to the clutch drum 81 of the lock-up clutch 8. Consequently, the drive member 11, that is, the first and second input plates 12 and 13, can rotate together with the clutch drum 81, and the front cover 3 (engine) and the drive member 11 of the damper device 10 are coupled to each other through engagement of the lock-up clutch 8.

Figure 3:
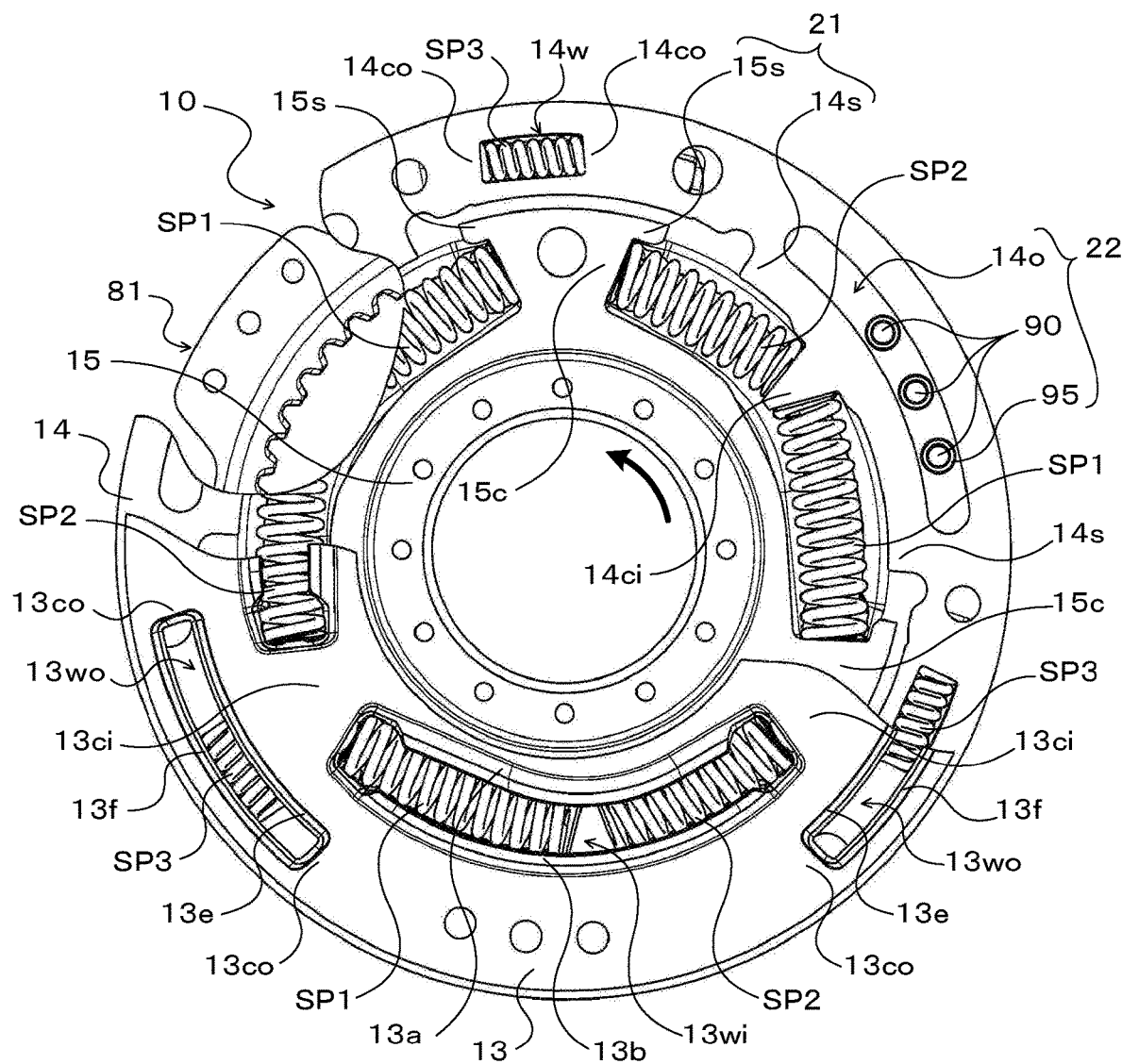
FIG. 3 is a front view illustrating the damper device according to the present disclosure.

As illustrated in FIGS. 2 and 3, the first input plate 12 has: a plurality of (e.g. three in the present embodiment) inner spring housing windows $12wi$ that extend arcuately and that are disposed at intervals (at equal intervals) in the circumferential direction; a plurality of (e.g. three in the present embodiment) outer spring housing windows (input-side housing windows) $12wo$ that extend arcuately and that are disposed at intervals (at equal intervals) in the circumferential direction on the radially outer side of the inner spring housing windows $12wi$; a plurality of (e.g. three in the present embodiment) inner spring abutment portions $12ci$; and a plurality of (e.g. six in the present embodiment) outer spring abutment portions (elastic body abutment portions) $12co$. The inner spring abutment portions $12ci$ are provided such that each inner spring abutment portion $12ci$ is interposed between the inner spring housing windows $12wi$ which are adjacent to each other along the circumferential direction. The outer spring abutment portions $12co$ are provided on both sides of each of the outer spring housing windows $12wo$ in the circumferential direction. In addition, the outer spring housing windows $12wo$ have a circumferential length that is longer than the natural length of the third springs SP3, and are provided on the radially outer side of the respective inner spring abutment portions $12ci$.

The first input plate 12 further has: a plurality of (e.g. three in the present embodiment) spring support portions $12a$ that each extend along the inner peripheral edge of a corresponding one of the inner spring housing windows $12wi$; a plurality of (e.g. three in the present embodiment) spring support portions $12b$ that each extend along the outer peripheral edge of a corresponding one of the inner spring housing windows $12wi$; a plurality of (e.g. three in the present embodiment) spring support portions $12e$ that each extend along the inner peripheral edge of a corresponding one of the outer spring housing windows $12wo$; and a plurality of (e.g. three in the present embodiment) spring support portions $12f$ that each extend along the outer peripheral edge of a corresponding one of the outer spring housing windows $12wo$.

The second input plate 13 has: a plurality of (e.g. three in the present embodiment) inner spring housing windows $13wi$ that extend arcuately and that are disposed at intervals (at equal intervals) in the circumferential direction; a plurality of (e.g. three in the present embodiment) outer spring housing windows (input-side housing windows) $13wo$ that extend arcuately and that are disposed at intervals (at equal intervals) in the circumferential direction on the radially outer side of the inner spring housing windows $13wi$; a plurality of (e.g. three in the present embodiment) inner spring abutment portions $13ci$; and a plurality of (e.g. six in the present embodiment) outer spring abutment portions (elastic body abutment portions) $13co$. As illustrated in FIG. 3, the inner spring abutment portions $13ci$ are provided such that each inner spring abutment portion $13ci$ is interposed between the inner spring housing windows $13wi$ which are adjacent to each other along the circumferential direction. The outer spring abutment portions $13co$ are provided on both sides of each of the outer spring housing windows $13wo$ in the circumferential direction. In addition, as illustrated in FIG. 3, the outer spring housing windows $13wo$ have a circumferential length that is longer than the natural length of the third springs SP3, and are provided on the radially outer side of the respective inner spring abutment portions $13ci$.

The second input plate 13 further has: a plurality of (e.g. three in the present embodiment) spring support portions $13a$ that each extend along the inner peripheral edge of a corresponding one of the inner spring housing windows $13wi$; a plurality of (e.g. three in the present embodiment) spring support portions $13b$ that each extend along the outer peripheral edge of a corresponding one of the inner spring housing windows $13wi$; a plurality of (e.g. three in the present embodiment) spring support portions $13e$ that each extend along the inner peripheral edge of a corresponding one of the outer spring housing windows $13wo$; and a plurality of (e.g. three in the present embodiment) spring support portions $13f$ that extend along the outer peripheral edge of a corresponding one of the outer spring housing windows $13wo$.

The intermediate member 14 is a plate-like annular member, and is disposed between the first and second input plates 12 and 13 in the axial direction in proximity to the outer periphery of the starting device 1. As illustrated in FIGS. 2 and 3, the intermediate member 14 has: a plurality of (e.g. three in the present embodiment) spring housing windows (intermediate housing windows) $14w$ disposed at intervals (at equal intervals) in the circumferential direction; a plurality of (e.g. three at intervals of 120° in the present embodiment) inner spring abutment portions $14ci$ provided at intervals in the circumferential direction to project radially inward from the inner peripheral portion; and a plurality of (e.g. six in the present embodiment) outer spring abutment portions (elastic body support portion/elastic body support) $14co$. The spring housing windows $14w$ have a circumferential length corresponding to the natural length of the third springs SP3. The outer spring abutment portions $14co$ are provided on both sides of each of the spring housing windows $14w$ in the circumferential direction.

The driven member 15 is a plate-like annular member, and is fixed to the damper hub 7 via a plurality of rivets, and disposed between the first and second input plates 12 and 13 in the axial direction so as to be surrounded by the intermediate member 14. As illustrated in FIGS. 2 and 3, the driven member 15 has a plurality of (e.g. three at intervals of 120° in the present embodiment) spring abutment portions $15c$ provided at intervals in the circumferential direction to extend radially inward from the outer peripheral portion.

The first and second springs SP1 and SP2 are held by the first and second input plates 12 and 13 so as to be arranged alternately along the circumferential direction of the damper device 10. That is, one first spring SP1 and one second spring SP2 are disposed in each of the inner spring housing windows $12wi$ and $13wi$, which face each other, of the first and second input plates 12 and 13 so as to be paired with each other (so as to act in series with each other). In addition, as seen from FIG. 2, the plurality of spring support portions 12a of the first input plate 12 each support (guide) a side portion of a corresponding one of the sets of first and second springs SP1 and SP2 on the lock-up clutch 8 side from the inner peripheral side. The plurality of spring support portions 12b each support (guide) a side portion of a corresponding one of the sets of first and second springs SP1 and SP2 on the lock-up clutch 8 side from the outer peripheral side. Furthermore, as seen from FIG. 2, the plurality of spring support portions 13a of the second input plate 13 each support (guide) a side portion of a corresponding one of the sets of first and second springs SP1 and SP2 on the turbine runner 5 side from the inner peripheral side. The plurality of spring support portions 13b each support (guide) a side portion of a corresponding one of the sets of first and second springs SP1 and SP2 on the turbine runner 5 side from the outer peripheral side.

With the damper device 10 in the attached state (with no torque transferred between the drive member 11 and the driven member 15), the inner spring abutment portions 12ci and 13ci, which face each other, of the drive member 11 (first and second input plates 12 and 13) are provided between the first and second springs SP1 and SP2, which are disposed in different inner spring housing windows 12wi and 13wi and which are not paired with each other (do not act in series with each other), to abut against end portions of such first and second springs SP1 and SP2. Furthermore, with the damper device 10 in the attached state, the inner spring abutment portions 14ci of the intermediate member 14 are provided between the first and second springs SP1 and SP2, which are disposed in the common inner spring housing windows 12wi and 13wi and which are paired with each other, to abut against end portions of such first and second springs SP1 and SP2. Consequently, a first end portion of each first spring SP1 abuts against the corresponding inner spring abutment portion 12ci and the corresponding inner spring abutment portion 13ci of the drive member 11, and second end portion of each first spring SP1 abuts against the corresponding inner spring abutment portion 14ci of the intermediate member 14. With the damper device 10 in the attached state, in addition, the first end portion of each second spring SP2 abuts against the corresponding inner spring abutment portion 14ci of the intermediate member 14, and the second end portion of each second spring SP2 abuts against the corresponding inner spring abutment portion 12ci and the corresponding inner spring abutment portion 13ci of the drive member 11.

Furthermore, with the damper device 10 in the attached state, as with the inner spring abutment portions 12ci and 13ci of the drive member 11, the spring abutment portions 15c of the driven member 15 are provided between the first and second springs SP1 and SP2, which are not paired with each other (do not act in series with each other), to abut against end portions of such first and second springs SP1 and SP2. Consequently, with the damper device 10 in the attached state, the first end portion of each first spring SP1 also abuts against the corresponding spring abutment portion 15c of the driven member 15, and the second end portion of each second spring SP2 also abuts against the corresponding spring abutment portion 15c of the driven member 15. As a result, the driven member 15 is coupled to the drive member 11 via the plurality of first springs SP1, the intermediate member 14, and the plurality of second springs SP2, and the first and second springs SP1 and SP2 which are paired with each other are coupled in series with each other via the inner spring abutment portion 14ci of the intermediate member 14 between the drive member 11 and the driven member 15. In the present embodiment, as illustrated in FIG. 3, the plurality of first and second springs SP1 and SP2 are disposed on the same circumference as each other, and the distance between the axis of the starting device 1 and the damper device 10 and the axis of the first springs SP1 and the distance between the axis of the starting device 1 etc. and the axis of the second springs SP2 are equal to each other.

In addition, the third spring SP3 is disposed in each of the spring housing windows 14w of the intermediate member 14. With the damper device 10 in the attached state, the outer spring abutment portions 14co of the intermediate member 14 each abut against the associated end portions of the third springs SP3. Thus, with the damper device 10 in the attached state, both end portions of each of the third springs SP3 are supported by the associated outer spring abutment portions 14co. In the present embodiment, in addition, both end portions of each of the third springs SP3 are disposed so as to be superposed on the first and second springs SP1 and SP2 as seen in the radial direction of the damper device 10 on the outer side in the radial direction with respect to the first and second springs SP1 and SP2. Consequently, it is possible to shorten the axial length of the damper device 10 and hence the starting device 1.

Furthermore, with the damper device 10 in the attached state, side portions of the third springs SP3 on the lock-up clutch 8 side are each positioned around the center portion, in the circumferential direction, of the corresponding outer spring housing window 12wo of the first input plate 12, and supported (guided) by the corresponding spring support portion 12e and the corresponding spring support portion 12f of the first input plate 12. In addition, with the damper device 10 in the attached state, side portions of the third springs SP3 on the turbine runner 5 side are each positioned around the center portion, in the circumferential direction, of the corresponding outer spring housing window 13wo of the second input plate 13, and supported (guided) by the corresponding spring support portion 13e and the corresponding spring support portion 13f of the second input plate 13.

Consequently, with the damper device 10 in the attached state, as illustrated in FIG. 3, a clearance in the circumferential direction determined in advance is formed between each of the third springs SP3 and the outer spring abutment portions 12co and 13co of the drive member 11 (first and second input plates 12 and 13) which are positioned on both sides of the third spring SP3 so that the third spring SP3 and the outer spring abutment portions 12co and 13co do not abut against each other. Thus, one of the outer spring abutment portions 12co and 13co which are positioned on both sides of each of the third springs SP3 abuts against one of the end portions of the third spring SP3 as the relative torsional angle between the drive member 11 and the intermediate member 14 is increased when torque is transferred between the drive member 11 and the driven member 15. In the present embodiment, the clearance, in the circumferential direction, between the end portions of the third springs SP3 and the outer spring abutment portions 12co and 13co of the drive member 11 with the damper device 10 in the attached state is determined such that the outer spring abutment portions 12co and 13co which are positioned on the rear side in the main rotational direction (the rotational direction at the time when the vehicle is traveling forward (of the engine); see the thick arrow in FIG. 3) of the drive member 11 etc. each abut against an end portion on one side (rear side in the rotational direction) of the corresponding third spring SP3 when input torque transferred from the engine to the drive member 11 has reached torque (first value) T1 that is determined in advance and that is smaller than torque T2 (second value) corresponding to a maximum torsional angle θmax of the damper device 10.

The damper device 10 also includes, as rotation restriction stoppers that restrict relative rotation between the drive member 11 and the driven member 15: a first stopper (output-side stopper) 21 that restricts relative rotation between the intermediate member 14 and the driven member 15; and a second stopper (input-side stopper) 22 that restricts relative rotation between the drive member 11 and the intermediate member 14. In the present embodiment, the first stopper 21 is constituted of: a plurality of stopper abutment portions 14s formed on the inner peripheral portion of the intermediate member 14 at intervals in the circumferential direction; and a plurality of stopper abutment portions 15s formed on the driven member 15. The stopper abutment portions 15s of the driven member 15 extend toward both sides in the circumferential direction from the outer peripheral portion of each of the spring abutment portions 15c. With the damper device 10 in the attached state, a clearance in the circumferential direction determined in advance is formed between each of the stopper abutment portions 14s of the intermediate member 14 and the associated stopper abutment portion 15s of the driven member 15. When the stopper abutment portions 14s and the stopper abutment portions 15s abut against each other as the intermediate member 14 and the driven member 15 are rotated relative to each other, relative rotation between the intermediate member 14 and the driven member 15 and deflection of the second springs SP2 are restricted.

The second stopper 22 is constituted of: the plurality of rivets 90 which couple the first and second input plates 12 and 13 of the drive member 11 to each other, rollers 95 mounted to the rivets 90; and a plurality of (e.g. three in the present embodiment) opening portions 14o formed in the intermediate member 14 so as to extend arcuately between the spring housing windows 14w, which are adjacent to each other, in the circumferential direction (see FIG. 3). Consequently, as illustrated in FIG. 3, the second stopper 22 is disposed on the outer side in the radial direction of the damper device 10 with respect to the first stopper 21 which includes the stopper abutment portions 14s which are formed on the inner peripheral portion of the intermediate member 14 and the stopper abutment portions 15s of the driven member 15. With the damper device 10 in the attached state, the plurality of rivets 90 and rollers 95 are disposed in each of the opening portions 14o of the intermediate member 14 so as not to abut against inner wall surfaces on both sides in the circumferential direction that define the opening portion 14o. When the roller 95 abuts against one of the inner wall surfaces of the opening portion 14o as the drive member 11 and the intermediate member 14 are rotated relative to each other, relative rotation between the drive member 11 and the intermediate member 14 and deflection of the first springs SP1 are restricted.

In the present embodiment, the first stopper 21 is configured to restrict relative rotation between the intermediate member 14 and the driven member 15 when torque input from the engine to the drive member 11 has reached the torque T1. In addition, the second stopper 22 is configured to restrict relative rotation between the drive member 11 and the intermediate member 14 when torque input to the drive member 11 has reached the torque T2 corresponding to the maximum torsional angle θmax. Consequently, the damper device 10 has damping characteristics in two stages. The second stopper 22 may restrict relative rotation between the drive member 11 and the driven member 15.

Subsequently, operation of the starting device 1 configured as discussed above will be described with reference to FIGS. 1, 4, etc.

When lock-up is released by the lock-up clutch 8 of the starting device 1, as seen from FIG. 1, torque (power) transferred from the engine to the front cover 3 is transferred to the input shaft IS of the transmission via a path that includes the pump impeller 4, the turbine runner 5, the driven member 15, and the damper hub 7. When lock-up is established by the lock-up clutch 8 of the starting device 1, in contrast, torque transferred from the engine to the drive member 11 via the front cover 3 and the lock-up clutch 8 is transferred to the driven member 15 and the damper hub 7 via the plurality of first springs SP1, the intermediate member 14, and the plurality of second springs SP2 until torque input to the drive member 11 reaches the torque T1. In this period, fluctuations in torque from the engine is damped (absorbed) by the first and second springs SP1 and SP2 which act in series with each other.

When torque input to the drive member 11 reaches the torque T1, as discussed above, relative rotation between the intermediate member 14 and the driven member 15 and deflection of the second springs SP2 are restricted by the first stopper 21. When the input torque becomes equal to or more than the torque T1, the outer spring abutment portions 12co and 13co on the rear side in the main rotational direction of the drive member 11 each abut against one of the end portions of the corresponding third spring SP3. Consequently, as illustrated in FIG. 4, each of the third springs SP3 transfers torque between the drive member 11 and the intermediate member 14 by acting in parallel with the corresponding first spring SP1 while being expanded and contracted between the outer spring abutment portion 14co of the intermediate member 14 on the front side in the main rotational direction and the outer spring abutment portions 12co and 13co of the drive member 11 on the rear side in the main rotational direction.

As a result, with relative rotation between the intermediate member 14 and the driven member 15 and deflection of the second springs SP2 restricted by the first stopper 21, as illustrated in FIG. 4, torque from the engine is transferred to the input shaft IS of the transmission via a path that includes the front cover 3, the lock-up clutch 8, the drive member 11, the first springs SP1 and the third springs SP3 which act in parallel with each other, the intermediate member 14, the second springs SP2, deflection of which has been restricted, the first stopper 21, the driven member 15, and the damper hub 7. While torque input to the drive member 11 is included in the range from the torque T1 to the torque T2, fluctuations in torque input to the front cover 3 are damped (absorbed) by the first springs SP1 and the third springs SP3 which act in parallel with each other.

In the damper device 10 of the starting device 1, as discussed above, when the outer spring abutment portions 12co and 13co of the drive member 11 abut against end portions of the third springs SP3 as the relative torsional angle between the drive member 11 and the intermediate member 14 is increased when torque is transferred between the drive member 11 and the driven member 15, the third springs SP3 act in parallel with the first springs SP1. Consequently, large torque fluctuations transferred to the drive member 11 can be absorbed by the first springs SP1 and the third springs SP3.

In the damper device 10, in addition, the intermediate member 14 is provided with the outer spring abutment portions (elastic body support portion) 14co which support both end portions of the third springs SP3 when torque is not transferred between the drive member 11 and the driven member 15. Consequently, the clearance between the outer spring abutment portions 12*co* and 13*co* and one of the end portions of the third spring SP3 with the damper device 10 in the attached state or at the time when torque is not transferred between the drive member 11 and the driven member 15 is determined in accordance with the relative torsional angle between the drive member 11 and the intermediate member 14.

Thus, with the damper device 10, it is possible to reduce the clearance between each of the outer spring abutment portions 12*co* and 13*co* and an end portion of the third spring SP3 at the time when torque is not transferred between the drive member 11 and the driven member 15 as compared to the case where an elastic body support portion that supports both end portions of the third springs SP3 is provided to one of the drive member 11 and the driven member 15 (see Japanese Patent Application Publication No. 2009-243536, for example). As a result, it is not necessary to reduce the relative torsional angle between the drive member 11 and the driven member 15 in order to cause the third springs SP3 to act in parallel with the first springs SP1, and thus the rigidity of the damper device 10 can be lowered by increasing the maximum torsional angle θmax of the drive member 11 relative to the driven member 15.

In the damper device 10, further, the second stopper 22 which restricts relative rotation between the drive member 11 and the intermediate member 14 is disposed on the outer side in the radial direction of the damper device 10 with respect to the first stopper 21 which restricts relative rotation between the intermediate member 14 and the driven member 15. By disposing the first and second stoppers 21 and 22 as displaced in the radial direction of the damper device 10 in this way, both the relative torsional angle between the drive member 11 and the intermediate member 14 and the relative torsional angle between the intermediate member 14 and the driven member 15 can be made larger. Consequently, it is possible to lower the rigidity of the damper device 10 by making the maximum torsional angle of the drive member 11 relative to the driven member 15 larger than θmax.

Furthermore, the first stopper 21 restricts relative rotation between the intermediate member 14 and the driven member 15 when torque input to the drive member 11 becomes equal to or more than the torque T1, and the second stopper 22 restricts relative rotation between the drive member 11 and the intermediate member 14 when the input torque reaches the torque T2 which is larger than the torque T1. In addition, the third springs SP3 are disposed on the outer side in the radial direction of the damper device 10 with respect to the first and second springs SP1 and SP2, and the outer spring abutment portions (elastic body abutment portion/elastic body abutment) 12*co* and 13*co* of the drive member 11 each abut against one of the end portions of the corresponding third spring SP3 when the input torque becomes equal to or more than the torque T1. Consequently, the clearance between each of the outer spring abutment portions 12*co* and 13*co* and an end portion of the third spring SP3 at the time when torque is not transferred between the drive member 11 and the driven member 15 can be secured sufficiently. Thus, it is possible to make the relative torsional angle between the drive member 11 and the intermediate member 14 larger, and to make the maximum torsional angle θmax of the drive member 11 relative to the driven member 15 larger.

In the damper device 10, in addition, the drive member 11 includes the first and second input plates 12 and 13 which face each other along the axial direction of the damper device 10 and which are coupled to each other, and the driven member 15 is disposed between the first and second input plates 12 and 13 in the axial direction. Furthermore, the intermediate member 14 has the spring housing windows 14*w* which house the third springs SP3, and is disposed between the first and second input plates 12 and 13 in the axial direction so as to surround the driven member 15. In addition, the first and second input plates 12 and 13 have the outer spring housing windows 12*wo* and 13*wo*, respectively, which house the side portions of the third springs SP3. The outer spring abutment portions 14*co* are provided on both sides of the spring housing windows 14*w* in the circumferential direction of the damper device 10, and the outer spring abutment portions 12*co* and 13*co* are provided on both sides of the outer spring housing windows 12*wo* and 13*wo* in the circumferential direction. Consequently, it is possible to provide the intermediate member 14 with the outer spring abutment portions 14*co*, and to provide the drive member 11 with the outer spring abutment portions 12*co* and 13*co*, while shortening the axial length of the damper device 10.

In the damper device 10, further, the intermediate member 14 has the plurality of opening portions 14*o* which are formed between the spring housing windows 14*w*, which are adjacent to each other, in the circumferential direction, and the second stopper 22 is constituted of the plurality of opening portions 14*o* of the intermediate member 14 and the plurality of rivets 90 (and rollers 95) which are inserted through the opening portions 14*o* and which couple the first and second input plates 12 and 13 to each other. Consequently, it is possible to constitute the second stopper 22 while suppressing an increase in the outside diameter of the intermediate member 14 and hence the dimension of the damper device 10 in the radial direction.

As has been described above, the present disclosure provides a damper device (10) that includes an input element (11), an intermediate element (14), an output element (15), a first elastic body (SP1) disposed between the input element (11) and the intermediate element (14), a second elastic body (SP2) disposed between the intermediate element (14) and the output element (15) to act in series with the first elastic body (SP1), and a third elastic body (SP3) that is capable of acting in parallel with at least one of the first and second elastic bodies (SP1, SP2). The damper device (10) includes: an elastic body support portion (14*co*) provided to the intermediate element (14) to support both end portions of the third elastic body (SP3) at least when torque is not transferred between the input element (11) and the output element (15); and an elastic body abutment portion (12*co*, 13*co*) provided to one of the input element (11) and the output element (15), the elastic body abutment portion (12*co*, 13*co*) not abutting against an end portion of the third elastic body (SP3) at least when torque is not transferred between the input element (11) and the output element (15), but abutting against one of the end portions of the third elastic body (SP3) as a relative torsional angle between the one of the input element (11) and the output element (15) and the intermediate element (14) is increased when torque is transferred between the input element (11) and the output element (15).

The intermediate element of the damper device has the elastic body support portion which supports both end portions of the third elastic body at least when torque is not transferred between the input element and the output element. In addition, one of the input element and the output element has the elastic body abutment portion which does not abut against an end portion of the third elastic body at least when torque is not transferred between the input element and the output element. The elastic body abutment portion abuts against one of the end portions of the third elastic body as the relative torsional angle between one of the input element and the output element and the intermediate element is increased when torque is transferred between the input element and the output element. Consequently, when the elastic body abutment portion of one of the input element and the output element abuts against an end portion of the third elastic body, the third elastic body acts in parallel with at least one of the first and second elastic bodies, and thus large torque fluctuations transferred to the input element can be absorbed by at least one of the first and second elastic bodies and the third elastic body. With the elastic body support portion provided to the intermediate element, in addition, the clearance between the elastic body abutment portion and one of the end portions of the third elastic body at least at the time when torque is not transferred between the input element and the output element is determined in accordance with the relative torsional angle between one of the input element and the output element and the intermediate element. Consequently, with the damper device, it is possible to reduce the clearance between the elastic body abutment portion and one of the end portions of the third elastic body at the time when torque is not transferred between the input element and the output element as compared to the case where the elastic body support portion is provided to one of the input element and the output element. Thus, it is not necessary to reduce the relative torsional angle between the input element and the output element in order to cause the third elastic body to act in parallel with at least one of the first and second elastic bodies, and thus the rigidity of the damper device can be lowered by increasing the maximum torsional angle of the input element relative to the output element. As a result, it is possible to provide a damper device that can absorb larger torque fluctuations and that has lower rigidity by increasing the maximum torsional angle of the input element relative to the output element.

The damper device (10) may further include an input-side stopper (22) that restricts relative rotation between the input element (11) and the intermediate element (14), and an output-side stopper (21) that restricts relative rotation between the intermediate element (14) and the output element (15); the output-side stopper (21) may restrict relative rotation between the intermediate element (14) and the output element (15) when torque input to the input element (11) reaches a first value (T1); the input-side stopper (22) may be disposed on an outer side in the radial direction of the damper device (10) with respect to the output-side stopper (21), and restrict relative rotation between the input element (11) and the intermediate element (14) when the input torque reaches a second value (T2) that is larger than the first value (T1); and the elastic body abutment portion (12co, 13co) may be provided to the input element (11), and abut against the one of the end portions of the third elastic body (SP3) when the input torque becomes equal to or more than the first value (T1). Consequently, the first and second elastic bodies act in series with each other until torque input to the input element reaches the first value, and the first and third elastic bodies act in parallel with each other when torque input to the input element becomes equal to or more than the first value. Thus, the damper device can be provided with vibration damping characteristics in two stages.

The damper device (10) may further include an input-side stopper (22) that restricts relative rotation between the input element (11) and the intermediate element (14), and an output-side stopper (21) that restricts relative rotation between the intermediate element (14) and the output element (15); and one of the input-side stopper (22) and the output-side stopper (21) may be disposed on an outer side in a radial direction of the damper device (10) with respect to the other. By disposing the input-side stopper and the output-side stopper as displaced in the radial direction of the damper device in this way, both the relative torsional angle between the input element and the intermediate element and the relative torsional angle between the intermediate element and the output element can be made larger. Thus, it is possible to lower the rigidity of the damper device by making the maximum torsional angle of the input element relative to the output element larger.

The input-side stopper (22) may be disposed on the outer side in the radial direction of the damper device (10) with respect to the output-side stopper (21); and the third elastic body (SP3) may be disposed on the outer side in the radial direction of the damper device (10) with respect to the first and second elastic bodies (SP1, SP2). Consequently, the clearance between the elastic body abutment portion and one of the end portions of the third elastic body at the time when torque is not transferred between the input element and the output element can be secured sufficiently. Thus, it is possible to make the relative torsional angle between the input element and the intermediate element larger, and to make the maximum torsional angle of the input element relative to the output element larger.

The input element (11) may include two input plates (12, 13) that face each other along an axial direction of the damper device (10) and that are coupled to each other; the output element (15) may be disposed between the two input plates (12, 13) in the axial direction; the intermediate element (14) may have an intermediate housing window (14w) that houses the third elastic body (SP3), and be disposed between the two input plates (12, 13) in the axial direction so as to surround the output element (15); the two input plates (12, 13) may have respective input-side housing windows (12wo, 13wo) that house a side portion of the third elastic body (SP3); and the elastic body support portion (14co) may be provided on both sides of the intermediate housing window (14w) in a circumferential direction of the damper device (10), and the elastic body abutment portion (12co, 13co) may be provided on both sides of the input-side housing window (12wo, 13wo) in the circumferential direction. Consequently, it is possible to provide the intermediate element with the elastic body support portion, and to provide the input element with the elastic body abutment portion, while shortening the axial length of the damper device.

The intermediate element (14) may have a plurality of the intermediate housing windows (14w) formed at intervals in the circumferential direction, and a plurality of opening portions (14o) formed between the intermediate housing windows (14w), which are adjacent to each other, in the circumferential direction; and the input-side stopper (22) may be constituted of the plurality of opening portions (14o) of the intermediate element (14), and a plurality of coupling members (90) that are inserted through the associated opening portions (14o) and that couple the two input plates (12, 13) to each other. Consequently, it is possible to constitute the input-side stopper while suppressing an increase in the outside diameter of the intermediate element and hence the dimension of the damper device in the radial direction.

The disclosure according to the present disclosure is not limited to the embodiment described above in any way, and it is a matter of course that the disclosure may be modified in various ways without departing from the range of the extension of the present disclosure. Furthermore, the mode for carrying out the disclosure described above is merely a specific form of the disclosure described in the "SUMMARY" section, and does not limit the elements of the disclosure described in the "SUMMARY" section.

INDUSTRIAL APPLICABILITY

The disclosure according to the present disclosure can be utilized in the field of manufacture of damper devices or the like.

The invention claimed is:

1. A damper device comprising:
an input;
an intermediate element;
an output;
a first elastic body disposed between the input and the intermediate element;
a second elastic body disposed between the intermediate element and the output to act in series with the first elastic body;
a third elastic body configured to act in parallel with at least one of the first and second elastic bodies;
an elastic body support provided to the intermediate element to support both end portions of the third elastic body at least when torque is not transferred between the input and the output; and
an elastic body abutment provided to one of the input and the output, the elastic body abutment not abutting against an end portion of the third elastic body at least when torque is not transferred between the input and the output, but abutting against one of the end portions of the third elastic body as a relative torsional angle between the one of the input and the output and the intermediate element is increased when torque is transferred between the input and the output.

2. The damper device according to claim 1, further comprising:
an input-side stopper that restricts relative rotation between the input and the intermediate element; and
an output-side stopper that restricts relative rotation between the intermediate element and the output, wherein:
the output-side stopper restricts relative rotation between the intermediate element and the output when torque input to the input reaches a first value;
the input-side stopper restricts relative rotation between the input and the intermediate element when the input torque reaches a second value that is larger than the first value; and
the elastic body abutment is provided to the input, and abuts against the one of the end portions of the third elastic body when the input torque becomes equal to or more than the first value.

3. The damper device according to claim 1, further comprising:
an input-side stopper that restricts relative rotation between the input and the intermediate element; and
an output-side stopper that restricts relative rotation between the intermediate element and the output, wherein
one of the input-side stopper and the output-side stopper is disposed on an outer side in a radial direction of the damper device with respect to the other.

4. The damper device according to claim 3, wherein:
the input-side stopper is disposed on the outer side in the radial direction of the damper device with respect to the output-side stopper; and
the third elastic body is disposed on the outer side in the radial direction of the damper device with respect to the first and second elastic bodies.

5. The damper device according to claim 1, wherein:
the input includes two input plates that face each other along an axial direction of the damper device and that are coupled to each other;
the output is disposed between the two input plates in the axial direction;
the intermediate element has an intermediate housing window that houses the third elastic body, and is disposed between the two input plates in the axial direction so as to surround the output;
the two input plates have respective input-side housing windows that house a side portion of the third elastic body; and
the elastic body support is provided on both sides of the intermediate housing window in a circumferential direction of the damper device, and the elastic body abutment is provided on both sides of the input-side housing window in the circumferential direction.

6. The damper device according to claim 2, wherein:
the input includes two input plates that face each other along an axial direction of the damper device and that are coupled to each other;
the output is disposed between the two input plates in the axial direction;
the intermediate element has an intermediate housing window that houses the third elastic body, and is disposed between the two input plates in the axial direction so as to surround the output;
the two input plates have respective input-side housing windows that house a side portion of the third elastic body; and
the elastic body support is provided on both sides of the intermediate housing window in a circumferential direction of the damper device, and the elastic body abutment is provided on both sides of the input-side housing window in the circumferential direction.

7. The damper device according to claim 3, wherein:
the input includes two input plates that face each other along an axial direction of the damper device and that are coupled to each other;
the output is disposed between the two input plates in the axial direction;
the intermediate element has an intermediate housing window that houses the third elastic body, and is disposed between the two input plates in the axial direction so as to surround the output;
the two input plates have respective input-side housing windows that house a side portion of the third elastic body; and
the elastic body support is provided on both sides of the intermediate housing window in a circumferential direction of the damper device, and the elastic body abutment is provided on both sides of the input-side housing window in the circumferential direction.

8. The damper device according to claim 4, wherein:
the input includes two input plates that face each other along an axial direction of the damper device and that are coupled to each other;
the output is disposed between the two input plates in the axial direction;
the intermediate element has an intermediate housing window that houses the third elastic body, and is disposed between the two input plates in the axial direction so as to surround the output;

the two input plates have respective input-side housing windows that house a side portion of the third elastic body; and the elastic body support is provided on both sides of the intermediate housing window in a circumferential direction of the damper device, and the elastic body abutment is provided on both sides of the input-side housing window in the circumferential direction.

9. The damper device according to claim 5, wherein:

the intermediate element has a plurality of the intermediate housing windows formed at intervals in the circumferential direction, and a plurality of opening portions formed between the intermediate housing windows, which are adjacent to each other, in the circumferential direction; and an input-side stopper is formed by the plurality of opening portions of the intermediate element, and a plurality of coupling members that are inserted through the associated opening portions and that couple the two input plates to each other.

10. The damper device according to claim 6, wherein:

the intermediate element has a plurality of the intermediate housing windows formed at intervals in the circumferential direction, and a plurality of opening portions formed between the intermediate housing windows, which are adjacent to each other, in the circumferential direction; and an input-side stopper is formed by the plurality of opening portions of the intermediate element, and a plurality of coupling members that are inserted through the associated opening portions and that couple the two input plates to each other.

11. The damper device according to claim 7, wherein:

the intermediate element has a plurality of the intermediate housing windows formed at intervals in the circumferential direction, and a plurality of opening portions formed between the intermediate housing windows, which are adjacent to each other, in the circumferential direction; and the input-side stopper is formed by the plurality of opening portions of the intermediate element, and a plurality of coupling members that are inserted through the associated opening portions and that couple the two input plates to each other.

12. The damper device according to claim 8, wherein:

the intermediate element has a plurality of the intermediate housing windows formed at intervals in the circumferential direction, and a plurality of opening portions formed between the intermediate housing windows, which are adjacent to each other, in the circumferential direction; and the input-side stopper is formed by the plurality of opening portions of the intermediate element, and a plurality of coupling members that are inserted through the associated opening portions and that couple the two input plates to each other.

* * * * *